US009118742B2

(12) United States Patent
Ganjam et al.

(10) Patent No.: US 9,118,742 B2
(45) Date of Patent: *Aug. 25, 2015

(54) DELIVERING A VIDEO STREAM

(71) Applicant: Conviva Inc., San Mateo, CA (US)

(72) Inventors: Aditya R. Ganjam, Mountain View, CA (US); Ion Stoica, Piedmont, CA (US); Karthik K. Lakshminarayanan, San Mateo, CA (US); Ryan J. Huebsch, San Francisco, CA (US); Jibin Zhan, Pittsburgh, PA (US); Hui Zhang, Pittsburgh, PA (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,000

(22) Filed: Dec. 4, 2013

(65) Prior Publication Data

US 2014/0297884 A1    Oct. 2, 2014

Related U.S. Application Data

(63) Continuation of application No. 13/546,983, filed on Jul. 11, 2012, now Pat. No. 8,626,941, which is a continuation of application No. 12/454,563, filed on May 19, 2009, now Pat. No. 8,244,899.

(51) Int. Cl.
*H04L 29/06* (2006.01)

(52) U.S. Cl.
CPC .............. *H04L 65/60* (2013.01); *H04L 65/601* (2013.01); *H04L 65/607* (2013.01); *H04L 65/80* (2013.01)

(58) Field of Classification Search
CPC ...... H04L 65/601; H04L 65/607; H04L 65/60
USPC .................................................. 709/231, 234
See application file for complete search history.

(56) References Cited

U.S. PATENT DOCUMENTS 8,244,899 B1 * 8/2012 Ganjam et al. ................ 709/231
8,626,941 B2 * 1/2014 Ganjam et al. ................ 709/231

* cited by examiner

*Primary Examiner* — Kristie Shingles
(74) *Attorney, Agent, or Firm* — Van Pelt, Yi & James LLP

(57) ABSTRACT

Delivering a video stream is disclosed. A request for the video stream is received. A past portion of the video stream is delivered to a client. The past portion has a marker time that precedes a current time by an interval that corresponds to a buffer length in a client buffer. Receiving a video stream is also disclosed. A request for the video stream is transmitted. A past portion of the video stream is received. The received past portion has a marker time that precedes a current time by an interval that corresponds to a buffer length in a client buffer.

23 Claims, 8 Drawing Sheets

DELIVERING A VIDEO STREAM

CROSS REFERENCE TO OTHER APPLICATIONS

This application is a continuation of co-pending U.S. patent application Ser. No. 13/546,983, entitled DELIVERING A VIDEO STREAM filed Jul. 11, 2012 which is incorporated herein by reference for all purposes, which is a continuation of U.S. patent application Ser. No. 12/454,563, now U.S. Pat. No. 8,244,899, entitled DELIVERING A VIDEO STREAM filed May 19, 2009 which is incorporated herein by reference for all purposes.

BACKGROUND OF THE INVENTION

Typically, viewers of streaming content, such as a sporting event feed, wish to view the content in as high a quality as possible. For example, viewers do not want the video stream to freeze or skip frames. Such viewers typically also wish the video stream to start playing as quickly as possible. For example, viewers do not want to wait several seconds for a video feed to appear in a player window after having decided to watch the feed. And, simultaneous viewers of the same feed may desire that the respective videos they watch are synchronized with those of other viewers. Unfortunately, these goals are in conflict. For example, one way to improve the quality of a video stream is for a client to make use of a large buffer. As packets are received, the client inserts them at the end of the buffer and plays packets at the front of the buffer. A large buffer gives the client more time to recover from occasional network congestions, or even from server failure. However, a large buffer takes longer to fill, resulting in a correspondingly longer startup time.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
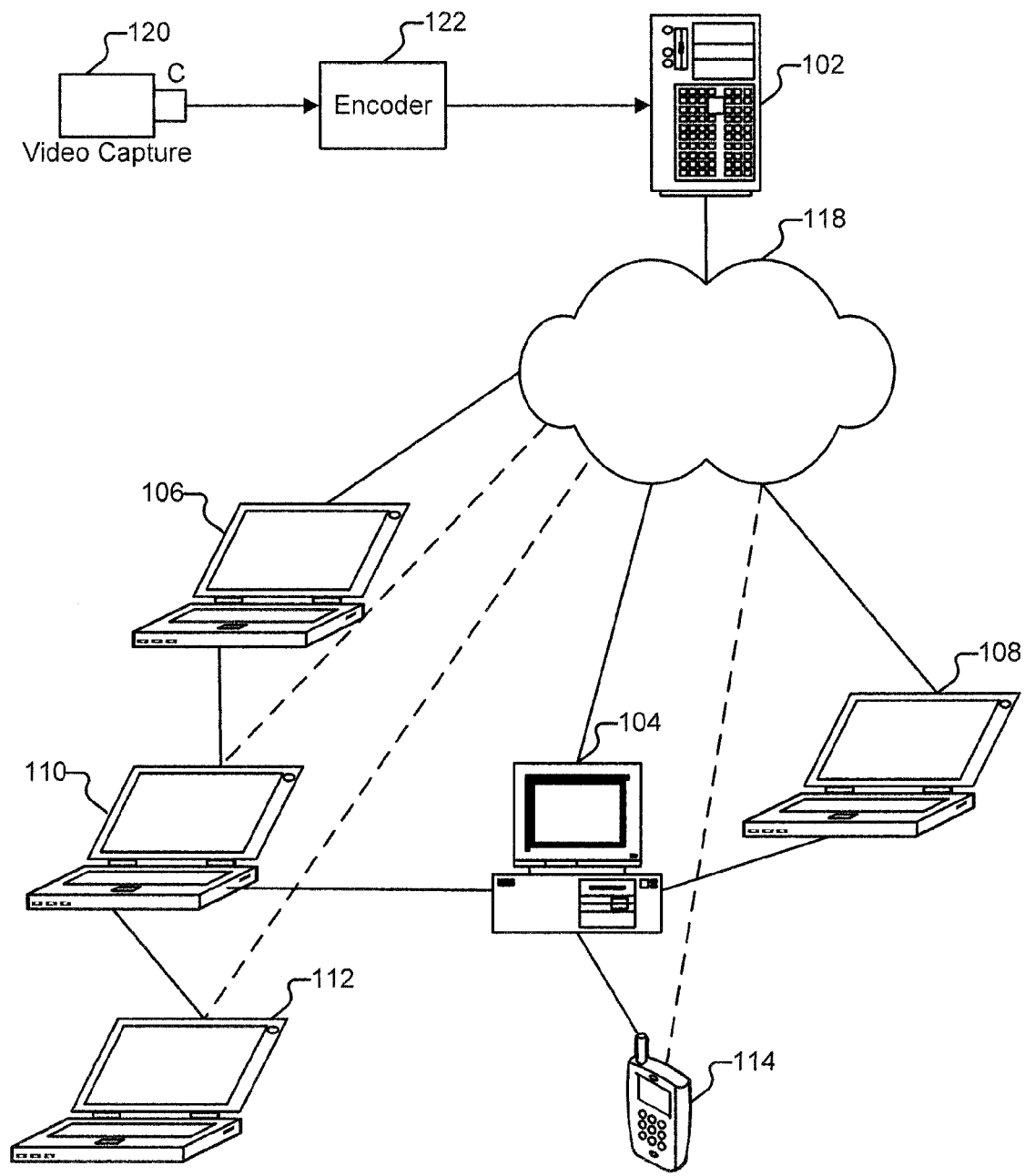
FIG. 1 illustrates an example of an environment in which video is streamed.

FIG. 1 illustrates an example of an environment in which video is streamed. Source 102 distributes video to clients such as nodes 104-114 via one or more networks represented herein as a single network cloud 118. In the example shown, the video being distributed is a live sporting event, such as a football game, captured by camera 120 and encoded by encoder 122. In various embodiments, other video sources are distributed and the techniques herein adapted accordingly. For example, in addition to live events, source 102 can be configured to distribute continuous feeds such as security camera data and also feeds of prerecorded content such as for a television network channel.

Camera 120, encoder 122, and source 102 may be collocated on a single platform, or may be physically separate, as applicable. Additionally, in some embodiments camera 120 and/or encoder 122 are under the control of a different entity than source 102. In addition to source 102, other nodes, such as traditional content distribution network (CDN) nodes are used to distribute content in various embodiments.

Network cloud 118 includes the Internet and assorted intranets. For example, clients 104 and 108 are both nodes on the same corporate network and are both also connected to source 102 via the Internet.

Clients 106-112 are typical consumer-oriented computers and include components such as a storage drive, RAM, and one or more processors. As described in more detail below, client 104 (also referred to herein as a "boost node") has a reliable, high speed connection to network 118 and also has considerable computing resources such as multiple fast processors and a large amount of memory. In contrast, client 110 has a slower connection to network 118 and limited memory. Client 114 is a handheld device, such as a web-enabled cellular phone. Other examples of clients (not shown) such as personal digital assistants, set-top boxes, game consoles, broadband routers, and digital video recorders may also be used in conjunction with the techniques described herein as applicable.

Figure 2:
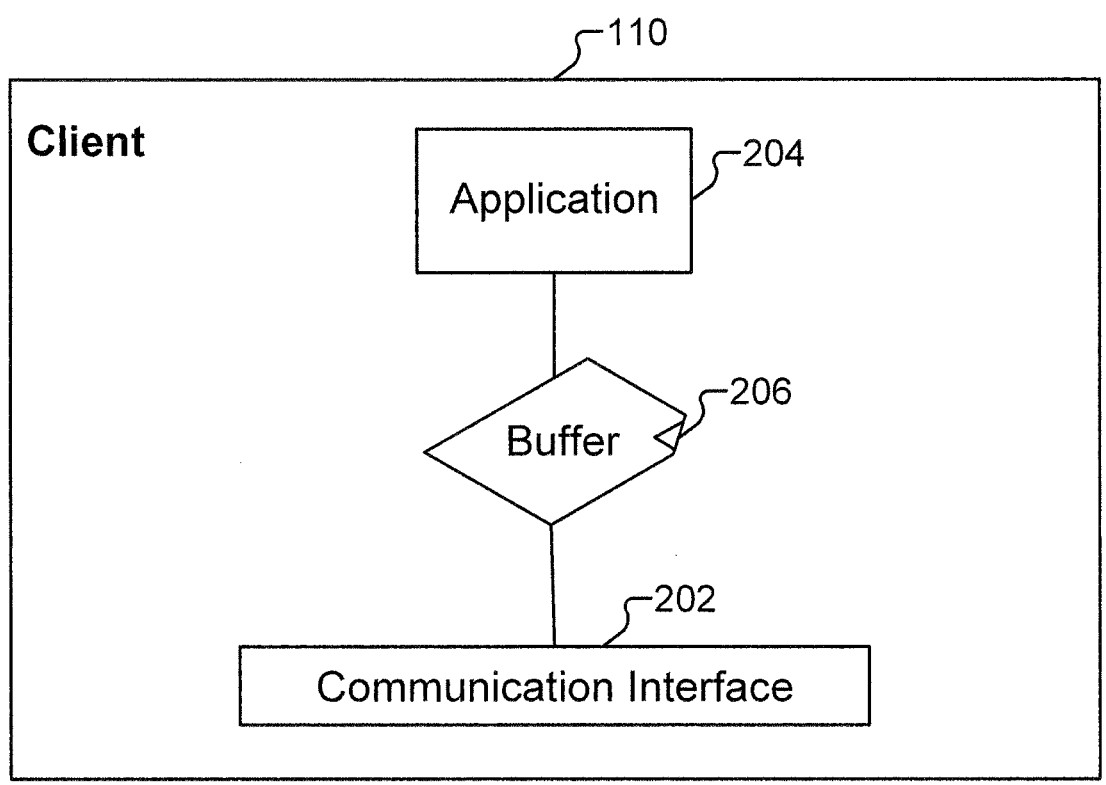
FIG. 2 illustrates an example of an embodiment of a client.

FIG. 2 illustrates an example of an embodiment of a client. In the example shown, client 110 includes a communication interface 202 that is used by client 110 to communicate with other devices/systems that are accessible via network cloud 118. For example, client 110 receives video packets from clients 106 and 104 via communication interface 202. Client 110 also transmits video packets to client 112 via communication interface 202. Buffer 206 holds video information. Whenever client 110 performs a task (such as requesting a portion of a video stream), either a single component or a subset of components or all components client 110 may cooperate to perform the task.

In the example of FIG. 1, client 104 has installed on it an application that facilitates the streaming of video content. The application is configured to receive content from source 102 (and/or from one or more other clients) and to redistribute the content to other nodes using peer-to-peer techniques. When client 104 is distributing video content to other clients, it is also referred to herein acting as a "parent" to those other clients. As used herein, "parent" denotes any node that sends data to another node and is applicable irrespective of whether tree-based protocols (in which a parent is defined with respect to an entire (sub)stream) or swarming protocols (in which a parent is defined with respect to a small granularity data unit such as a data packet or block) are used to distribute the stream data. Source 102 is also a parent for clients 106, 104, and 108. Client 114 also has an application installed on it to facilitate the streaming of video, but it is not configured to redistribute the content.

Client 110 does not have a dedicated video streaming application installed. Instead, client 110 has installed on it a typical commercially available web browser application such as MICROSOFT INTERNET EXPLORER, MOZILLA FIREFOX, or APPLE SAFARI. Client 110 streams video content and redistributes it to other clients via browser application 204 in conjunction with a JAVA applet, ADOBE FLASH content, SILVERLIGHT component or similar technology.

Figure 3:
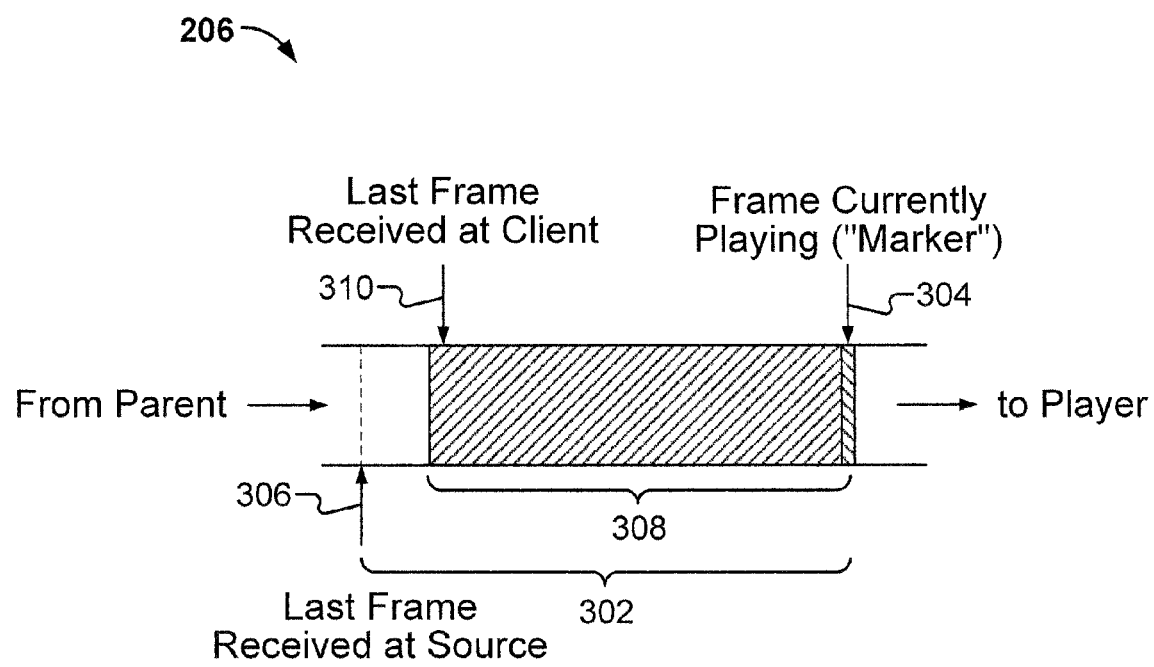
FIG. 3 illustrates an example of an embodiment of a buffer.

FIG. 3 illustrates an example of an embodiment of a buffer. Suppose a user of client 110 (hereinafter referred to as "Alice") is currently viewing a live basketball game with client 110. Buffer 206 is a first-in-first-out buffer of size 302 (e.g., 30 seconds) and stores video data received from source 102 (and/or parent nodes such as node 106) by client 110. As client 110 receives packets, they are inserted at the end of the buffer (310). The packets at the beginning of the buffer (304) are played by a video player. In the example shown, buffer 206 is approximately 85% full of video data, as indicated by region 308.

When a client begins receiving a video stream, the client requests a portion of the video that is T seconds behind the live event, where T is the maximum size of the buffer. Accordingly, the maximum size of the buffer dictates by how much the video being played to a user of a client is behind the live event. For example, if the maximum size of the buffer the client is configured to build is 30 seconds, then, assuming a full buffer, the video being played is at least 30 seconds behind the live feed.

Suppose the current time is 11:05:00 am and that the basketball game Alice is watching started 65 minutes ago, at 10:00:00 am. As used herein, the "current" time in such a scenario is 11:05:00. In contrast, the portion of the game that would appear in Alice's video player at the current time is offset by T time. If T is 30 seconds, the video shown by the player would have been captured (e.g., by camera 120) at time 11:04:30. The time at which the video that is currently being played on client 110 was captured (or otherwise received by source 102) is denoted as the "marker" time. In the above example, the "marker" time is 11:04:30-30 seconds earlier than the "current" time.

In the example shown in FIG. 3, line 306 indicates the current time at source 102 (e.g., 0 seconds in the past). Line 304 indicates the portion of the frame at the head of the buffer currently being played for Alice. As mentioned above, the video being played for Alice was received at the source 30 seconds ago. The difference between the time of current time at source 310 and the time of frame at the head of the buffer 306 is 30 seconds. The data in the buffer represents an approximately 25 second span of data, the most recent of which was captured (e.g., by camera 120) approximately 5 seconds ago. The buffer does not yet have the most recent 5 seconds of the game, as indicated by the gap between segment 308 and point 306.

In some embodiments the amount of buffered video data required to start playing a video stream is less than size 308. Instead of waiting for the entire buffer to fill up, client 110 is configured to show video to Alice after only a subset of the buffer has been downloaded. This allows for video to be displayed quickly, minimizing startup time. The startup time is determined by the size of the subset (e.g., 3 seconds), while the quality of the feed is determined by the entire buffer size (e.g., 30 seconds). Once the video is playing, the client tries aggressively to fill the rest of the buffer. For example, client 110 may initially receive video data from source 102 directly or from a high quality node such as node 104 until client 110's buffer is filled. Once the buffer is filled, client 110 may be directed to change the node(s) from which it receives video data. For example, client 110 may be directed to receive subsequent video data from node 106 and to stop receiving video data directly from source 102.

Figure 4:
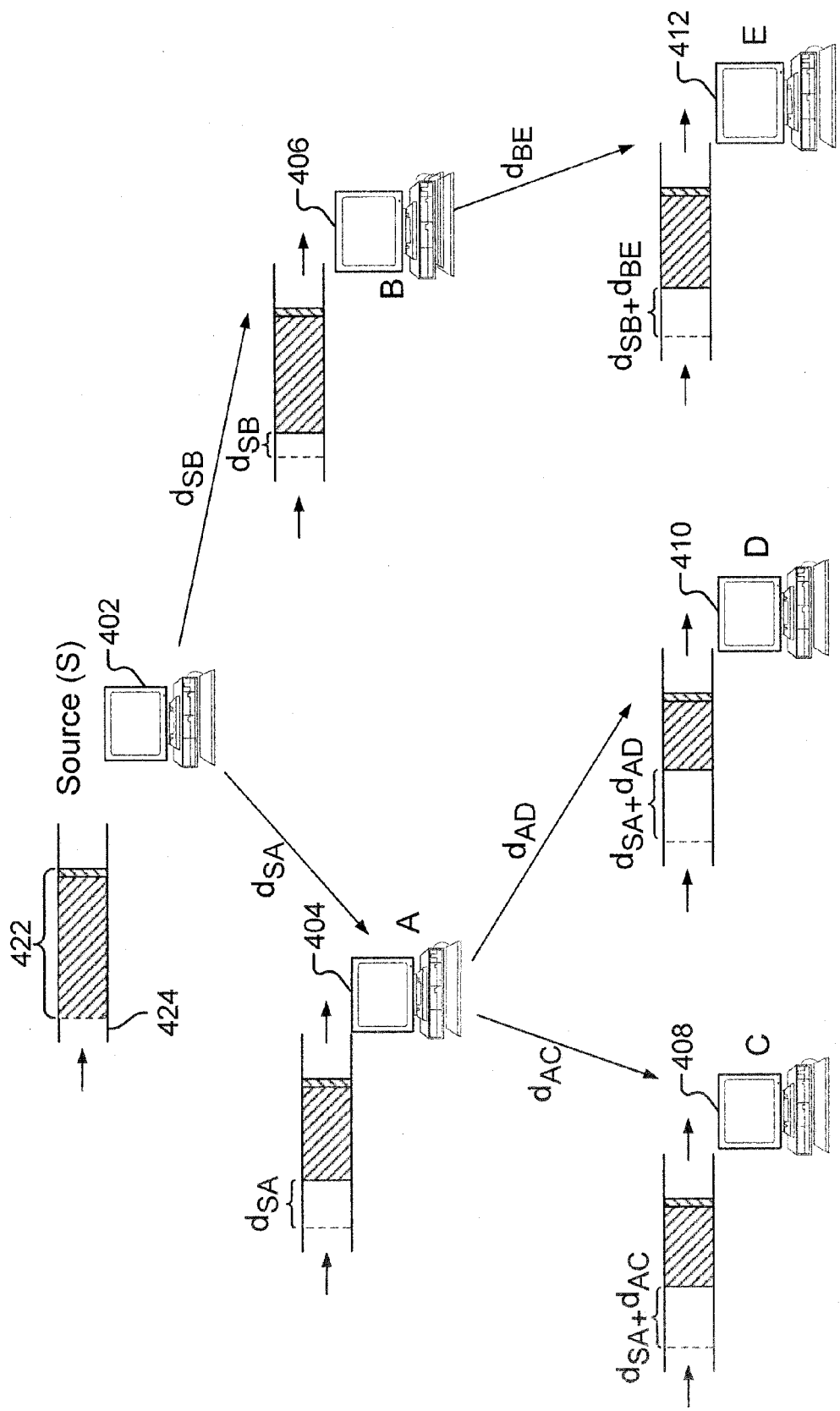
FIG. 4 illustrates an example of an environment in which video is distributed.

FIG. 4 illustrates an example of an environment in which video is distributed. In the example shown, node A (404) and node B (406) each receive video data from source 402. Nodes C (408) and D (410) receive data from node A (404), while node E (412) receives video data from node B (406).

Each of the nodes maintains a buffer. The buffers have a maximum size (e.g., 30 seconds) and also an operative size, which can vary from node to node, and can vary for a particular node based on factors such as network conditions. As explained previously, when a client begins receiving a video stream, the client requests a portion of the video that is T seconds behind the live event, where T is the maximum size of the buffer. In the example shown in FIG. 4, each of nodes A-E would thus be simultaneously playing to their respective users the feed of the basketball game 30 seconds in the past.

Typically, the more hops away a client is from source 102, the smaller the operative buffer of the client will be. In the example of FIG. 3, node 110 has a maximum buffer of 30 seconds, and an operative buffer of 25 seconds. In the example shown in FIG. 4, node D also has a buffer of maximum size 30 seconds. However, node D's operative buffer is much smaller—approximately 15 seconds. Nonetheless, both node D and Alice's node 110 will display the same portion of the basketball game at the same time. Both clients' players will display the game in a synchronized (though slightly delayed) fashion.

In the example shown in FIG. 4, upon joining in the streaming of a feed, every client (e.g., A-E) knows the current time and requests video frames that are T seconds behind that current time. As described in more detail below, a variety of techniques can be used to propagate current time information to clients, both initially, and, in some embodiments, periodically while the video continues to be streamed.

Since every client plays frames at the marker time, latency (e.g., introduced as packets are propagated using peer-to-peer techniques) and other delay along the data path does not influence viewer synchronization. Instead, such delays impact only the size of the buffer (and thus, potentially, video quality). For instance, the size of the buffer at client D is $T-(d_{SA}+d_{AD})$, where $d_{SA}$ represents the delay between source 102 and client A, and $d_{AD}$ represents the delay between client A (which is the parent of D) and D. The size of the buffer at client D is smaller than the size of the buffer at the source.

Figure 5:
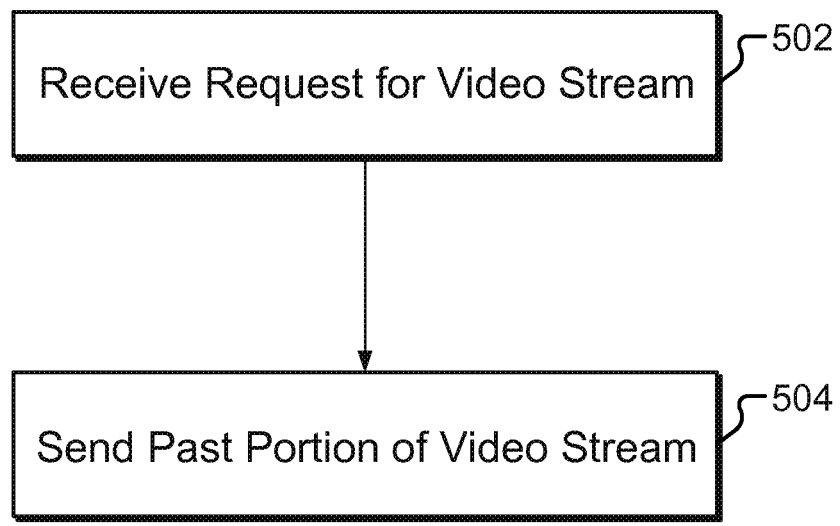
FIG. 5 illustrates an example of a process for delivering a video stream.

FIG. 5 illustrates an example of a process for delivering a video stream. In some embodiments the process shown in FIG. 5 is performed by source 102. The process begins at 502 when a request for the video stream is received. For example, when Alice instructs client 110 that she would like to watch the basketball game (e.g., by clicking on a "watch live now" button provided on a web page as rendered in her web browser), a request is received from client 110 by source 102 at 502.

At 504, a past portion of the video stream is delivered to the client. As explained above, the past portion has a marker time that precedes the current time by an interval T. For example, once a request for the basketball game is received from client 110, source 102 causes the video stream to be delivered to client 110. In this case, source 102 initiates the delivery of video data that begins with the frame having a marker time 304.

Figure 6:
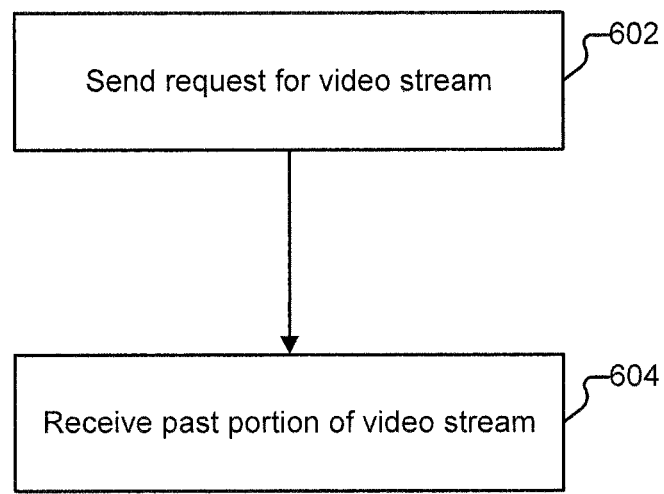
FIG. 6 illustrates an example of a process for receiving a video stream.

FIG. 6 illustrates an example of a process for receiving a video stream. In some embodiments the process shown in FIG. 6 is performed by a client such as client 110. The process begins at 602 when a request for the video stream is transmitted. For example, when Alice instructs client 110 that she would like to watch the basketball game (e.g., by clicking on a "watch live now" button), a request is transmitted from client 110 to source 102 at 602. Client 110 can also request content (starting at what client 110 believes is the marker time) from other clients, as applicable, and the process shown in FIG. 6 adapted accordingly.

At 604, a past portion of the video stream is received. As explained above, the past portion has a marker time that precedes the current time by an interval. For example, in response to the request transmitted at 602, at 604 client 110 receives—either from source 102 or from another node such as node 104—video data that begins with the frame having a marker time 304.

Redistribution of Data

Figure 7:
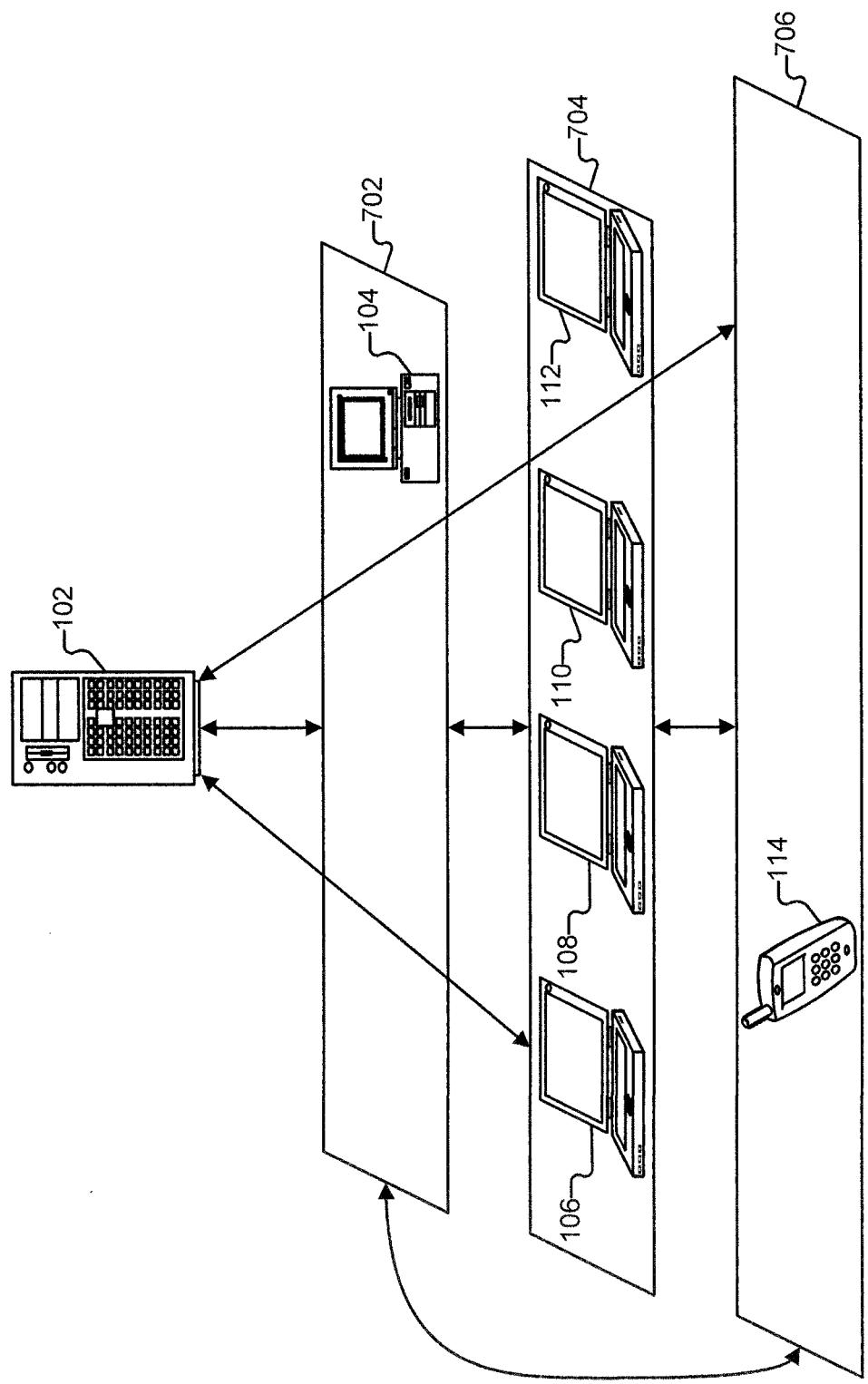
FIG. 7 illustrates an embodiment of an environment in which video is streamed.

FIG. 7 illustrates an embodiment of an environment in which video is streamed. In various embodiments source 102, and/or another system working in conjunction with source 102 (not pictured) coordinates the redistribution of data from nodes such as clients 106 and 104 to other nodes such as clients 110 and 114. In the example shown in FIG. 7, nodes are classified into one of three groups based on factors such as their current and historic network connection speeds and reliability. Other groupings may also be used, as applicable.

Nodes included in the top level of a three-level hierarchy of nodes (702) include high capacity and stable nodes whose output capacity is larger than the rate of the data being distributed. Nodes in level 702 are used as "boost" nodes to assist clients in quickly filling their buffers. In some cases, nodes in level 702 are typical end-user-owned computers that are also used to view content. Nodes in level 702 can also be provided by the entity that controls source 102, or by a third party, for the purpose of improving the distribution of content.

The second level (704) includes nodes configured both to receive content and to redistribute content. Nodes in level 704 typically have fewer resources than nodes in level 702, but are nonetheless able to simultaneously receive and transmit video stream data.

The bottom level (706) includes mainly low-capacity nodes that are configured to receive but not redistribute content. Typically, the output capacities of nodes in level 706 are lower than the data rate. However, in some embodiments clients in level 706 may be physically capable of redistributing stream data, but are configured not to—such as due to a policy set by a user of the node, or by an administrator.

In various embodiments, source 102 is configured to continually assess and reassign, on an ongoing basis, the node(s) from which a client receives data, and also, if applicable, the node(s) to which the client redistributes that data. The reassessment/reassignment process can occur with a very high frequency, such as on second-level intervals, to help address the situations such as the distribution of a live feed in which high availability of a connection may be paramount. One example way to perform fast reassignment is as follows. Clients are organized based on their available uplink capacities using a priority queue. When a client loses one or more of its parents or the aggregate rate it receives from its parents is less than the stream rate, the reassignment algorithm will select new parents for the client by choosing the clients with the highest available bandwidth from the priority queue. In some embodiments, source 102 balances between the parent's uplink capacity and geographic proximity by first selecting a larger set of potential parents and then selecting the parents which are the closest to the client from this set. A potential parent is a node whose available bandwidth is larger than the additional required bandwidth of the child node.

Source 102 periodically exchanges information with clients using messages referred to herein as heartbeat messages. Source 102 provides instructions on which nodes the client should obtain the appropriate stream data from and, as described in more detail below, can also provide information such as the current time and the marker time. Clients send source 102 information such as current CPU load, available storage, geographic location, information for each data stream received/sent from/to other clients, and an IP-level path to other clients. In addition to this information, source 102 has access to BGP feeds and the mappings between IP addresses and their geographic locations. Source 102 uses the received information to maintain a global and up-to-date view of the environment shown in FIG. 7. This view includes the locations of the clients, whether a client is behind NAT/firewall (and if yes, the type of NAT/firewall), client resource availability, and the level of network congestion along the paths between various clients.

Figure 8:
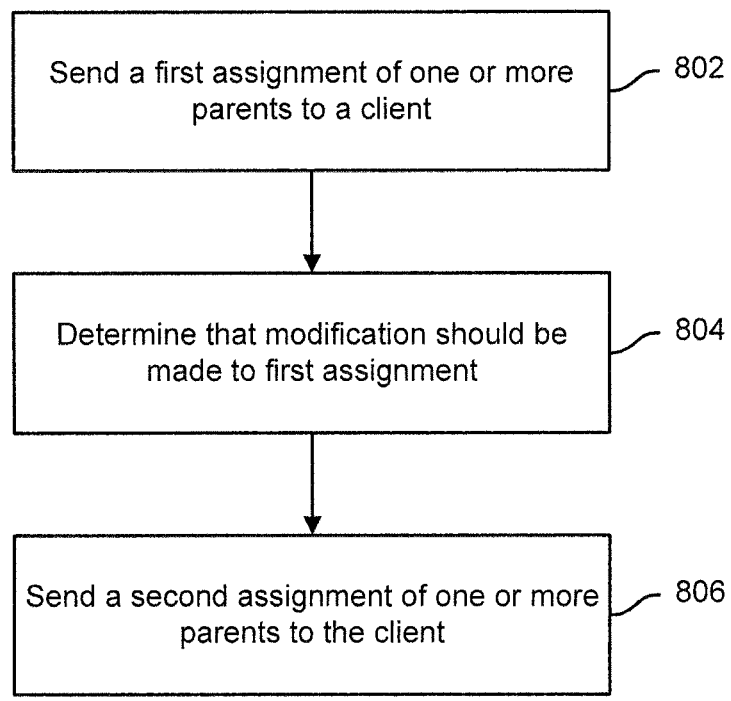
FIG. 8 illustrates an example of a process for coordinating the assignment of parents.

FIG. 8 illustrates an example of a process for coordinating the assignment of parents. In some embodiments the process shown in FIG. 8 is implemented by source 102. The process begins at 802 when an assignment of one or more parents is sent to a client such as client 110. As one example, source 102 is assigned as a parent at 802. Boost nodes such as node 104 and/or other nodes may also be assigned as initial parents at 802 instead of or in addition to source 102.

At 804, a determination is made (e.g., by source 102) that a modification should be made to the parents assigned at 802. One reason for such a determination is that a client could be successfully served by a parent that is currently idle or otherwise underutilized. For example, suppose client 110's buffer is filled completely within a few seconds of the initial assignment at 802 being made. At 804, source 102 might determine that client 110 no longer needs the benefit of boost node 104's bandwidth and that client 106 would make an acceptable parent for client 110. Another reason for the determination of 804 is that a client is being underserved by its current parent (e.g., due to a change in a network condition), that the parent has dropped off the network, etc.

If it is determined that the parent(s) of a client should be changed, at 806 the revised assignment is propagated to the client. In some embodiments the revised assignment is transmitted by source 102 via a heartbeat message.

Propagating Timestamps

As explained above, when clients initially request a video stream, they are configured to play the feed as of the marker time, rather than the current time. It is possible that, due to the peer-to-peer distribution techniques used by clients in environment FIG. 1, frames may be received (and possibly out of chronological order) from different parents. And, a client such as a grandchild (the child of a child) of client 112 may receive a frame only after it has been propagated through many clients, with the corresponding latency introduced. Accordingly, in some embodiments clients need to know a time at the source (e.g. the current or marker time) so that they can correctly play the appropriate frames at the appropriate time.

In some embodiments clients are continuously aware of the current (and/or marker) time at the source, and not just when the client initially requests the feed. Such reoccurring time synchronization can be used, for example, to address the different clock skew times that different clients might have.

One way of maintaining knowledge of the time at source 102 is for all clients in the environment shown in FIG. 1 to use a protocol such as the Network Time Protocol (NTP) to synchronize their times. In this case, a client needs only to know by how much is the marker behind the synchronized global time. If the synchronized global time is G and the marker is T seconds behind, then the marker is G-T.

An application level protocol can also be used to distribute the appropriate time information. For example, when source 102 receives a packet from encoder 122 (at a time "t"), source 102 can be configured to embed a timestamp in the packet. When source 102 transmits the packet, it embeds in the packet an indication that the marker time is t−T (where T is the maximum buffer size). Every client maintains a local marker time $M_L$ that is used to track information about the marker time at the source. Whenever the client receives a packet of the stream—whether from source 102 or from another client—the client updates its local $M_L$ as being the maximum value of the existing $M_L$ and the marker value included in the packet. In doing so, the client will maintain a value for the marker time with an accuracy that is bounded by the shortest delay path between the source and the client.

Yet another way to propagate timing information is to use a control plane such as is formed by the heartbeat messages exchanged between clients and source 102. As explained above, source 102 periodically sends heartbeat messages to clients. Such messages can include the marker time of source 102 and clients can adjust their $M_L$ values as appropriate based on those messages. In some embodiments the heartbeats are distributed by a computer cluster in a well-connected datacenter. In such an environment, the source sends its heartbeats to the computer cluster which in turn redistributes the heartbeats to the appropriate clients.

In various embodiments a combination of techniques is used to maintain knowledge of the time at source 102. For example, clients can be configured to receive the information via heartbeat messages and also encoded in stream data, and to update $M_L$ as being the maximum value received from either source, accordingly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a set of one or more processors configured to, using a set of one or more interfaces:
    receive a request for a video stream;
    deliver a past portion of the video stream to a client;
    provide an indication of at least one of a marker time and a current time to the client, wherein the client is configured to play the past portion of the video stream according to the indication of the at least one of the marker time and the current time, and wherein the marker time precedes the current time by an interval; and
  a memory coupled to the set of one or more processors and configured to provide the set of one or more processors with instructions.

2. The system of claim 1 wherein the indication comprises a timestamp.

3. The system of claim 2 wherein the timestamp is delivered with the past portion of the video stream.

4. The system of claim 3, wherein the timestamp is encoded in the past portion of the video stream.

5. The system of claim 1 wherein the past portion of the video stream includes a frame having the marker time.

6. The system of claim 5 wherein the past portion of the video stream begins with the frame having the marker time.

7. The system of claim 1 wherein the client is configured to play the past portion of the video stream starting at the marker time.

8. The system of claim 1 wherein the indication is provided on a reoccurring basis.

9. The system of claim 8 wherein the indication is provided using a protocol used to synchronize a plurality of clients.

10. The system of claim 9 wherein the protocol comprises the Network Time Protocol (NTP).

11. The system of claim 1 wherein the indication is provided in a heartbeat message to the client.

12. The system of claim 1 wherein the client is configured to maintain a local marker time.

13. The system of claim 1 wherein the interval is a buffer length.

14. The system of claim 1 wherein the interval is a maximum buffer length.

15. A method, comprising:
  receiving, via a set of one or more interfaces, a request for a video stream;
  delivering a past portion of the video stream to a client;
  providing, a set of one or more processors, an indication of at least one of a marker time and a current time to the client, wherein the client is configured to play the past portion of the video stream according to the indication of the at least one of the marker time and the current time, and wherein the marker time precedes the current time by an interval.

16. The method of claim 15 wherein the indication comprises a timestamp.

17. The method of claim 16, wherein the timestamp is encoded in the past portion of the video stream.

18. The method of claim 15 wherein the past portion of the video stream includes a frame having the marker time.

19. The method of claim 15 wherein the client is configured to play the past portion of the video stream starting at the marker time.

20. The method of claim 15 wherein the indication is provided on a reoccurring basis.

21. The method of claim 20 wherein the indication is provided using a protocol used to synchronize a plurality of clients.

22. The method of claim 15 wherein the client is configured to maintain a local marker time.

23. A computer program product, the computer program product being embodied in a non-transitory computer readable storage medium and comprising computer instructions for:
- receiving, via a set of one or more interfaces, a request for a video stream;
- delivering a past portion of the video stream to a client;
- providing, a set of one or more processors, an indication of at least one of a marker time and a current time to the client, wherein the client is configured to play the past portion of the video stream according to the indication of the at least one of the marker time and the current time, and wherein the marker time precedes the current time by an interval.

* * * * *

UNITED STATES PATENT AND TRADEMARK OFFICE
CERTIFICATE OF CORRECTION

PATENT NO. : 9,118,742 B2
APPLICATION NO. : 14/097000
DATED : August 25, 2015
INVENTOR(S) : Ganjam et al.

Page 1 of 1

It is certified that error appears in the above-identified patent and that said Letters Patent is hereby corrected as shown below:

In the claims

In column 8, Line 45 in Claim 15, after "providing," insert --using--.
In column 9, Line 8 in Claim 23, after "providing," insert --using--.

Signed and Sealed this
Twenty-eighth Day of June, 2016

Michelle K. Lee
*Director of the United States Patent and Trademark Office*